United States Patent
Zhao et al.

(10) Patent No.: US 11,483,080 B2
(45) Date of Patent: Oct. 25, 2022

(54) PATH LOSS DETERMINATION METHOD AND APPARATUS

(71) Applicant: BEIJING XIAOMI MOBILE SOFTWARE CO., LTD., Beijing (CN)

(72) Inventors: Qun Zhao, Beijing (CN); Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 91 days.

(21) Appl. No.: 16/882,495

(22) Filed: May 24, 2020

(65) Prior Publication Data

US 2020/0287638 A1   Sep. 10, 2020

Related U.S. Application Data

(63) Continuation of application No. PCT/CN2017/119507, filed on Dec. 28, 2017.

(51) Int. Cl.
*H04B 17/318* (2015.01)
*H04W 52/02* (2009.01)
(Continued)

(52) U.S. Cl.
CPC ...... *H04B 17/318* (2015.01); *H04W 52/0206* (2013.01); *H04W 52/0209* (2013.01); *H04W 84/042* (2013.01); *H04W 84/18* (2013.01)

(58) Field of Classification Search
CPC ............... H04B 17/318; H04B 17/309; H04W 52/0206; H04W 52/0209; H04W 84/042;
(Continued)

(56) References Cited

U.S. PATENT DOCUMENTS

2010/0285830 A1   11/2010   Englund
2014/0135055 A1*  5/2014   Fu ................... H04W 52/325
                                                            455/522
(Continued)

FOREIGN PATENT DOCUMENTS

CN    104159318 A    11/2014
CN    104349443 A    2/2015
(Continued)

OTHER PUBLICATIONS

3GPP TSG RAN WG1 Meeting #86bis, Source to WG: ZTE R1-1609827 Lisbon, Portugal, Oct. 10-14, 2016 (Year: 2016).*
(Continued)

*Primary Examiner* — Rebecca E Song
*Assistant Examiner* — Malick A Sohrab
(74) *Attorney, Agent, or Firm* — Syncoda LLC; Feng Ma

(57) ABSTRACT

A method for determining pass path can be applied to a narrowband internet of things (NB-IoT) device. The method includes: determining transmission power of a downlink narrowband reference signal (NRS); determining a measurement value of narrowband reference signal received power (NRSRP); and in a case that a preset higher layer filter parameter is not received from a base station, determining path loss between the base station and the UE according to the transmission power of the downlink NRS and the measurement value of the NRSRP. As such, during the determination of transmission power of the NB-IoT device, a configuration information sending burden of the base station can be reduced, unnecessary retransmission can be avoided, and power consumption of user equipment (UE) in the NB-IoT may be reduced.

18 Claims, 8 Drawing Sheets

(51) Int. Cl.
*H04W 84/04* (2009.01)
*H04W 84/18* (2009.01)

(58) Field of Classification Search
CPC ..... H04W 84/18; H04W 4/70; H04W 52/242;
H04L 5/005; H04L 1/0027; H04L 5/0048;
Y02D 30/70
See application file for complete search history.

(56) References Cited

U.S. PATENT DOCUMENTS

| | | | |
|---|---|---|---|
| 2014/0204782 A1 | 7/2014 | Geirhofer et al. | |
| 2016/0183195 A1* | 6/2016 | Gao | H04W 52/325 455/522 |
| 2017/0064571 A1 | 3/2017 | Kusashima et al. | |
| 2017/0303207 A1 | 10/2017 | Awad et al. | |
| 2018/0352590 A1 | 12/2018 | Sha et al. | |
| 2019/0036647 A1* | 1/2019 | Gowda | H04W 52/0219 |
| 2020/0314760 A1* | 10/2020 | Ye | H04W 52/10 |
| 2021/0298046 A1* | 9/2021 | Li | H04W 52/262 |

FOREIGN PATENT DOCUMENTS

| | | |
|---|---|---|
| CN | 104919737 A | 9/2015 |
| CN | 107231680 A | 10/2017 |
| CN | 108235797 A | 6/2018 |
| WO | 2013082920 A1 | 6/2013 |
| WO | 2014056137 A1 | 4/2014 |
| WO | 2016051712 A1 | 4/2016 |

OTHER PUBLICATIONS

3GPP, TS 36.213 v13.7.0, E-UTRA; Physical layer procedures (Release 13) (36213-d70_s14-xx), server publication date (Sep. 24, 2017.).
First Office Action of the Korean application No. 10-2020-7020299, dated Apr. 15, 2021.
First Office Action of the Japanese application No. 2020-532008, dated Jun. 8, 2021.
International Search Report in the International Application No. PCT/CN2017/11950, dated Sep. 30, 2018.
English translation of the Written Opinion of the International Search Authority in the International Application No. PCT/CN2017/119507, dated Sep. 30, 2018.
ZTE: "Clarification on nrs-Power related description", 3GPP Draft; R1-1609827 Draft CR for NRS-Power, 3rd Generation Partnership Project (3GPP), Mobile Competence Centre: 650, Route Des Lucioles; F-06921 Sophia-Antipolis Cedex: France, vol. RAN WG1, No. Lisbon, Portugal; Oct. 10, 2016-Oct. 14, 2016 Oct. 9, 2016 (Oct. 9, 2016), XP051149854, Retrieved from the Internet: URL: http://www.3gpp.org/ftp/Meetings_3GPP_SYNC/RAN1/Docs/ [retrieved on Oct. 9, 2016]. p. 1 p. 2.
Samsung: "On UL Power Control", 3GPP Draft; R1-1716040 Power Control Framework-Samsung, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017 Sep. 17, 2017 (Sep. 17, 2017), XP051339499, Retrieved from the Internet: URL: http://www.3gpp.org/ftp/Meetings_3GPP_SYNC/RAN1/Docs/ [retrieved on Sep. 17, 2017]. section 2.1; p. 4.
Ericsson: "UE measurement model", 3GPP Draft: R2-092571 UE Measurement Model. 3rd Generation Partnership Project (3GPP), Mobile Competence Centre; 650, Route Des Lucioles; F-06921 Sophia-Antipolis Cedex: France, No. Seoul, Korea; Mar. 27, 2009, Mar. 27, 2009 (Mar. 27, 2009), XP050340185, retrieved on [Mar. 27, 2009]. section 5.5.3.1-5.5.3.2.
Supplementary European Search Report in the European application No. 17936151.4, dated Nov. 23, 2020.
3GPP TSG RAN#76, Ericsson, On the UL power control of NPRACH in NB-IoT, RP-171218, Jun. 2017.
First Office Action of the Russian application No. 2020123427, dated Jan. 22, 2021.
3GPP TSG-RAN WG4 Meeting RAN4#82 R4-1701221, Athens, Greece, Feb. 13-17, 2017, Agenda item: 7.21.3.2, Source: ZTE, Title: RRM measurement on non-anchor carrier, Document for: Approval.
Notice of Allowance of the Korean application No. 10-2020-7020299, dated Aug. 2, 2022.

* cited by examiner

PATH LOSS DETERMINATION METHOD AND APPARATUS

CROSS-REFERENCE TO RELATED APPLICATION

This application is a continuation of International Application PCT PCT/CN2017/119507 filed on Dec. 28, 2017, the disclosure of which is hereby incorporated in its entirety.

BACKGROUND

Along with development of wireless communication technologies, a mobile communication network has gradually been evolved into a 5th-Generation (5G) network. Long Term Evolution (LTE)-based Narrowband Internet of Things (NB-IoT) has been approved by the 3rd Generation Partnership Project (3GPP) to become a standard of a low-power wide-area network in a 5G network communication system. NB-IoT has deep indoor coverage, low cost, low power consumption, wide connections and the like for typical application scenarios of low data rate, massive terminals, wide coverage requirement and other characteristics, and has broad prospect in application of Internet of things such as smart city, wearable devices, smart home and smart meters.

SUMMARY

The present disclosure generally relates to the technical field of communication, and more specifically to a path loss determination method and apparatus.

Embodiments of the present disclosure provide a path loss determination method and apparatus, to reduce a burden of a base station for sending configuration information, avoid unnecessary retransmission and reduce power consumption of a device in the NB-IoT.

According to a first aspect of the embodiments of the present disclosure, a method for determining path loss is provided, which may be applied to a narrowband internet of things (NB-IoT) device and may include:
  determining transmission power of a downlink narrowband reference signal (NRS);
  determining a measurement value of narrowband reference signal received power (NRSRP); and
  determining the path loss between the base station and the NB-IoT device, such as user equipment (UE), according to the transmission power of the downlink NRS and the measurement value of the NRSRP.

According to a second aspect of the embodiments of the present disclosure, an apparatus for determining path loss is provided, which is at least a part of a narrowband internet of things (NB-IoT) device and includes:
  a processor; and
  memory configured to store instructions executable by the processor,
  wherein the processor is configured to:
  determine transmission power of a downlink narrowband reference signal (NRS);
  determine a measurement value of narrowband reference signal received power (NRSRP); and
  determine the path loss between the base station and the UE according to the transmission power of the downlink NRS and the measurement value of the NRSRP.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
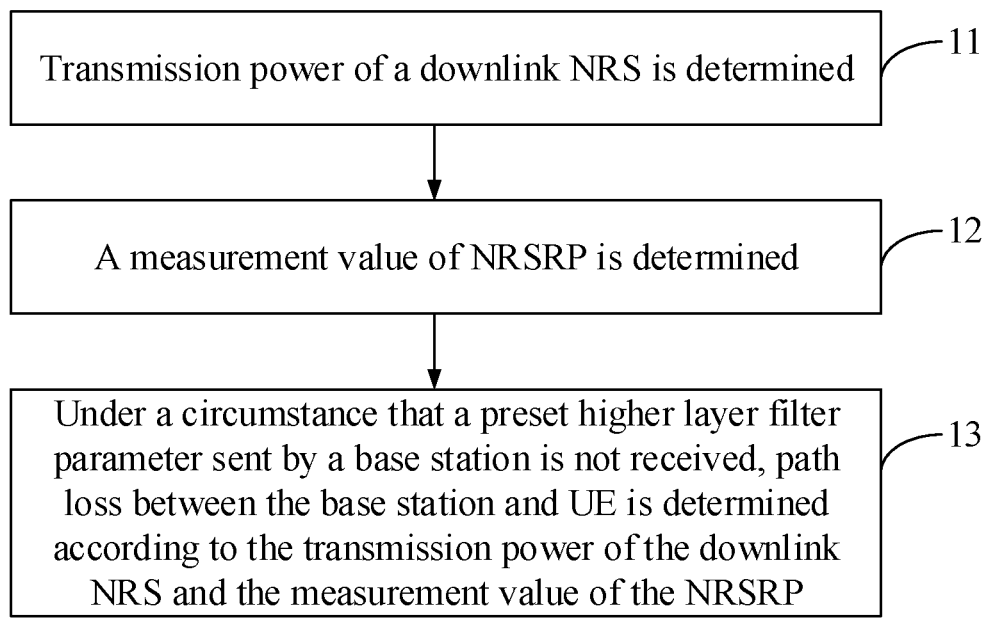
FIG. 1 is a flowchart showing a path loss determination method according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

Power control is an important function of a wireless communication system. For ensuring that a base station can receive information from User Equipment (UE), the UE is required to control its own transmission power according to power control indication information sent by the base station.

In an LTE system, uplink transmission power of UE may be adjusted in real time according to path loss between a base station and the UE. The UE may calculate a difference between transmission power of a downlink reference signal and a measurement value of higher layer filtered Reference Signal Received Power to determine the path loss of a channel between the UE and the base station. In this process of determining the uplink transmission power of the UE, the UE is not only required to determine the transmission power of the downlink reference signal according to system information transmitted by the base station but also required to determine a filter parameter of a higher layer filter through configuration information transmitted by the base station, and then the UE may calculate the measurement value of the higher-layer filtered reference signal received power according to the higher layer filter parameter.

According to the characteristics of the NB-IoT, UE in the NB-IoT has the characteristics of low data transmission rate, large number, poor channel quality and the like, and is usually applied to a still or low-speed moving scenario. If the UE in the NB-IoT still adopts a power control manner in the related arts, the load of transmission of configuration information by the base station may be inevitably increased due to the large numbers of UE devices, and a load of a system control channel may be further increased, and meanwhile, relatively poor channel quality of the narrowband UE may inevitably increase the number of retransmission times of high-load configuration information, waste system resources and also increase power consumption of the UE.

Execution entities involved in the present disclosure include UE and a base station in the NB-IoT. The base station may be a base station, a sub base station and the like provided with a large number of antenna arrays. The UE may be a user device, a user node, a tablet computer, a wearable device, a smart meter, a smart home device, a smart city device and the like that moves at a low speed or is still relative to the base station. In a specific implementation process, the base station and the UE may be independent from each other and also communicate with each other to implement the technical solutions provided in the present disclosure together.

In the present disclosure, the UE is required to determine, before transmitting uplink service data to the base station, transmission power of a Physical Uplink Shared Channel (PUSCH) of each basic information transmission unit according to configuration information of the base station. The basic information transmission unit may be a transmission resource unit such as a subframe, a slot, a mini-slot and a symbol. In the process of determining the transmission power of the UE, i.e., in a power control process, it is needed to determine path loss between the base station and the UE at first.

Referring to FIG. 1, which is a flowchart showing a path loss determination method according to some embodiments of the present disclosure. The method is applied to UE in the 5G NB-IoT and following generations of wireless communication network, and the UE may be a massive Machine Type Communication (mMTC) device. The method may include the following operations.

In operation 11, transmission power of a downlink narrowband reference-signal (NRS) is determined.

In the embodiments of the present disclosure, for determining its own transmission power, the UE in the NB-IoT is required to learn Reference Signal Power (RSP) determined by a base station at first. The RSP refers to the transmission power of the downlink NRS.

In some embodiments, the UE may obtain the RSP through preset configuration information sent by the base station, for example, the preset system information may be a System Information Block 2 (SIB2) broadcast by a base station of a cell.

In operation 12, a measurement value of Narrowband Reference Signal Received Power (NRSRP) is determined.

Like an acquisition manner for a measurement value of reference signal received power in an LTE system, in the embodiments of the present disclosure, the measurement value of the NRSRP may be determined by a physical layer of the UE according to energy of a downlink reference signal received in a unit time. The downlink reference signal may be a reference signal sent by the base station and configured to estimate uplink channel quality. In the present disclosure, the UE may estimate the uplink channel quality according to received power of the downlink signal and further determine transmission power required by information transmission between the UE and the base station. The measurement value of the NRSRP may be understood as practical received power, measured by the physical layer of the UE, of the downlink reference signal.

In operation 13, under a circumstance that a preset higher layer filter parameter is not received from a base station, path loss between the base station and the UE is determined according to the transmission power of the downlink NRS and the measurement value of the NRSRP.

The preset higher layer filter parameter sent by the base station refers to a parameter configured to determine a higher layer filter coefficient of the UE, and is supposed to be represented by M. In related arts, the UE may be required to receive the preset higher layer filter parameter M from the base station to determine its own higher layer filter coefficient.

In the embodiments of the present disclosure, for determining the path loss by the UE, the base station may be not required to transmit the preset higher layer filter parameter. That is, the UE is not required to receive more configuration information, to estimate the path loss between the base station and the UE, so that a configuration information load of the base station can be reduced. In addition, the UE may be not required to detect the preset higher layer filter parameter transmitted by the base station, power consumption can be reduced.

In the present disclosure, the operation 13 may be implemented in at least the following two conditions.

A first condition is that: higher-layer filtering is required to be performed on the measurement value, obtained by the physical layer of the UE, of the reference signal received power.

Figure 2:
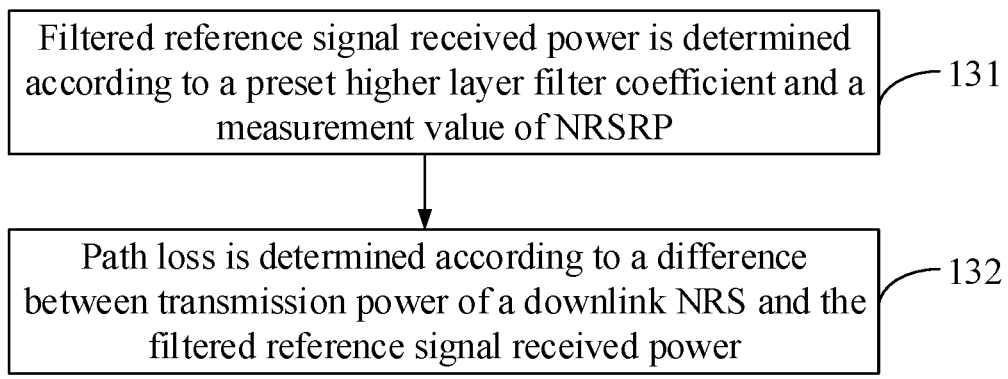
FIG. 2 is a flowchart showing another path loss determination method according to some embodiments of the present disclosure.

Referring to FIG. 2, which is a flowchart showing another path loss determination method according to some embodiments of the present disclosure. The operation 13 may include the following operations.

In operation 131, higher layer filtered reference signal received power is determined according to a higher layer filter coefficient and the measurement value of the NRSRP.

The higher layer of the UE refers to a layer above the physical layer in a communication protocol, for example, a Radio Resource Control (RRC) layer. In the embodiments of the present disclosure, after obtaining the measurement value of the NRSRP, the physical layer of the UE may send it to the higher layer of the UE, for example, to the RRC layer, and filtering processing may be then performed on the measurement value of the NRSRP through a higher-layer filter to obtain the higher layer filtered reference signal received power, that may be represented as higher layer filtered NRSRP.

It is assumed that the higher layer filtered NRSRP is simply represented as Fn, a calculation involves a filter coefficient a of the higher-layer filter. In the present disclosure, the higher-layer filter coefficient a may be determined by the UE, and may be not required to be determined in real time according to the preset higher layer filter parameter transmitted by the base station.

Figure 3:
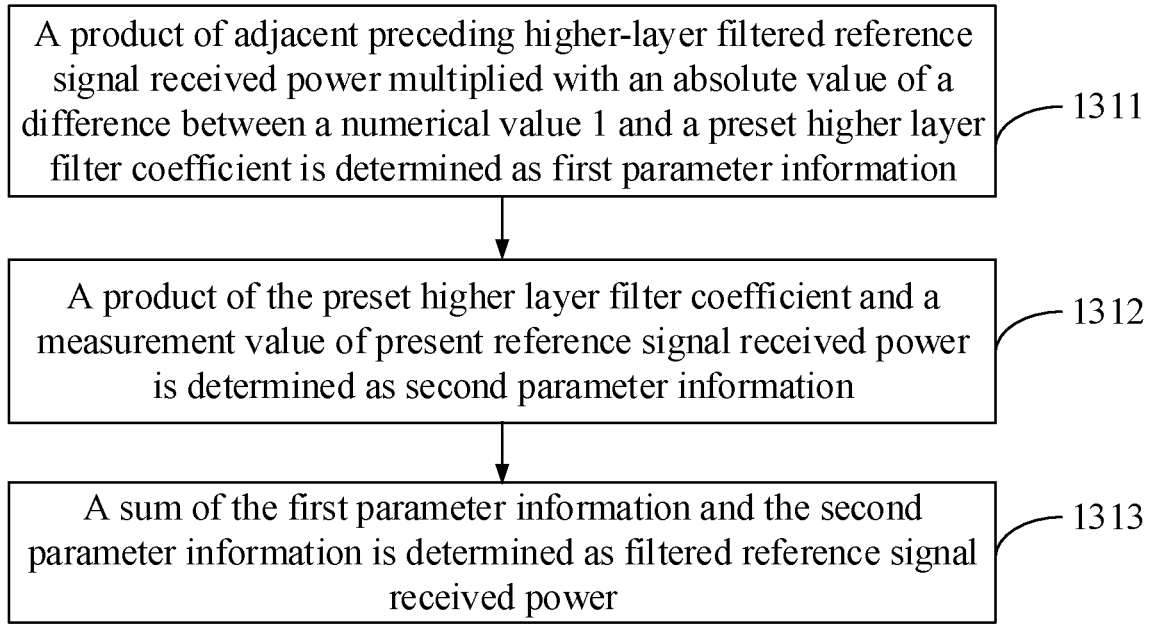
FIG. 3 is a flowchart showing another path loss determination method according to some embodiments of the present disclosure.

Referring to FIG. 3, which is a flowchart showing another path loss determination method according to some embodiments of the present disclosure. The operation 131 may include the following operations.

In operation 1311, a product of an absolute value of a difference between a numerical value 1 and the preset higher layer filter coefficient multiplied with adjacent preceding higher layer filtered reference signal received power is determined as first parameter information.

In the present disclosure, a value of the preset higher layer filter coefficient a determined by the UE may be within a range of 0 to 1. The adjacent preceding higher layer filtered reference signal received power refers to higher layer filtered reference signal received power determined by the UE in a previous adjacent time.

In operation 1312, a product of the preset higher layer filter coefficient and a measurement value of present reference signal received power is determined as second parameter information.

In operation 1313, a sum of the first parameter information and the second parameter information is determined as the filtered reference signal received power.

The calculation may be represented by the following formula (1):

$$F_n = (1-\alpha)F_{n-1} + \alpha M_n, \quad (1)$$

wherein a represents the preset higher layer filter coefficient in the UE, $F_n$ represents the present filtered reference signal received power, $F_{n-1}$ represents the adjacent preceding higher layer filtered reference signal received power, and represents the measurement value, presently obtained by the physical layer of the UE, of the NRSRP.

Exemplarily, it is assumed the preset higher layer filter coefficient a in the UE, for example, a smart meter, is 0.5, the present higher layer filtered NRSRP may be represented by the following formula (2):

$$F_n = 0.5*(F_{n-1} + M_n). \quad (2)$$

In operation 132, the path loss is determined according to a difference between the transmission power of the downlink NRS and the filtered reference signal received power Correspondingly, the UE may estimate the path loss by the following formula (3):

$$PLc = \text{nrs-Power} + \text{nrs-PowerOffsetNonAnchor} - \text{higher layer filtered NRSRP}, \quad (3)$$

wherein PLc represents the path loss, nrs-Power represents the transmission power of the NRS transmitted by the base station, nrs-PowerOffsetNonAnchor represents a non-anchor power offset of the NRS, and the higher layer filtered NRSRP is a narrowband reference signal power filtered by the higher layer.

The two physical parameters nrs-Power and nrs-PowerOffsetNonAnchor may be acquired by the higher layer, for example, the RRC layer, of the UE from related configuration information received from the base station.

In the embodiments of the present disclosure, the UE may determine the path loss through the following process: the measurement value of the present NRSRP $M_N$ is determined by the physical layer according to the received downlink reference signal; then, the measurement value of the present NRSRP is sent to the higher-layer, for example, the RRC layer, and filtering processing is performed to obtain a measurement value of the filtered reference signal received power; and next, the higher layer filtered NRSRP is returned to the physical layer to enable the physical layer of the UE to estimate the present path loss between the base station and the UE according to the formula (3) and further determine transmission power of the UE for a PUSCH.

In some embodiments of the present disclosure, the UE may dynamically determine the preset higher layer filter coefficient according to a change of preset parameter information of the UE. The preset parameter information may include at least one of followings: a preset device performance parameter, a service type of a bearer service and other information. The preset device performance parameter may be a parameter such as a moving speed of the UE. The service type of the bearer service may be a service type such as mMTC.

In some embodiments of the present disclosure, the UE may dynamically adjust its higher layer filter coefficient between numerical values 0 and 1 according to the impact from the preset parameter information on the transmission power of the UE.

In some embodiments, the determination process may be as follows: a coefficient impact value is determined according to the preset parameter information, the coefficient impact value being configured to determine the higher layer filter coefficient of the UE; the coefficient impact value is compared with a preset threshold; in response to the coefficient impact value is smaller than the preset threshold, the higher layer filter coefficient is determined according to a first preset numerical value; and in response to the coefficient impact value is larger than or equal to the preset threshold, the higher layer filter coefficient is determined according to a second preset numerical value. The first preset numerical value and the second preset numerical value are preset numerical values between numerical values 0 and 1 and, for example, are 0.3 and 0.6 respectively.

Exemplarily, in a case that the UE dynamically adjusts the preset higher layer filter coefficient according to the preset device performance parameter and it is assumed that the preset device performance parameter is the moving speed of the UE, the adjustment process may be as follows: a present moving speed of the UE is determined, and in a case that the present moving speed is lower than a preset speed threshold, the preset higher layer filter coefficient may be determined in any one of the following manners:

a first manner is that: the numerical value of the preset filter coefficient of the UE is determined to be the first preset numerical value, for example, 0.3; and a second manner is that: a higher layer filter coefficient, for example, 0.2, is dynamically determined within a preset numerical value range taking the first numerical value as an endpoint value, for example, 0-0.3, according to a preset rule and the present moving speed.

Similarly, in a case that the present moving speed is greater than or equal to the preset speed threshold, a higher layer filter coefficient may be determined based on the abovementioned manners to be the second preset numerical value, for example, 0.6, or a higher layer filter coefficient, for example, 0.45, may be dynamically determined according to the preset rule within another preset numerical value range, such as 0.3~0.6, which takes the second numerical value as an endpoint value.

Like the above, the UE may dynamically adjust the higher layer filter coefficient between the numerical values 0 and 1 according to the service type of the present bearer service, or, calculate the coefficient impact value according to the device performance parameter of the UE and the service type and according to a preset weight and dynamically determine a higher layer filter coefficient of the UE between the numerical values 0 and 1 according to the coefficient impact value and the preset rule.

For example, when a main service of the UE is a service in a low-speed or still state, for example, a meter reading service and a monitoring service, the UE may determine the numerical value of the preset higher layer filter coefficient to be a relatively small numerical value, for example, 0.2; and when the main service of the UE is a service at a medium/high speed, for example, Internet of vehicles and trajectory monitoring, the numerical value of the preset higher layer filter coefficient may be determined to be a relatively large numerical value, for example, 0.6.

A second condition is that: the UE directly estimates the path loss according to the measurement value, measured by the physical layer, of the downlink narrowband transmission power.

In the embodiments of the present disclosure, the UE may determine the path loss according to the difference between the transmission power of the downlink narrowband transmission power and the measurement value of the narrowband reference signal received power.

In the embodiments of the present disclosure, it can be understood that a in the formula (1) may be 1. Corresponding path-loss estimation may be represented by the following formula (4):

$$PLc = nrs\text{-}Power + nrs\text{-}PowerOffsetNonAnchor - NRSRP. \quad (4)$$

In the embodiments of the present disclosure, the UE may determine the path loss through the following process: the measurement value of the present NRSRP, i.e., $M_n$, is determined by the physical layer according to the received downlink reference signal, and nrs-Power and nrs-PowerOffsetNonAnchor information transmitted by the base station is acquired by the physical layer from a higher-layer, for example, a RRC layer; and then, the transmission power of the UE for the PUSCH is further determined according to the present path loss between the base station and the UE is estimated by the physical layer of the UE according to the formula (4).

It can be seen that, in the present disclosure, considering characteristics of UE in the NB-IoT, i.e., the UE may be applied to a low-data-transmission-rate, low-speed moving or still scenario, higher layer filter coefficient configuration of a base station is of little help to improve measurement accuracy of the UE, and thus the base station is not required to send a preset higher layer filter coefficient to the UE in real time to enable the UE to determine a higher layer filter coefficient according to the preset higher layer filter parameter, so that a system signaling overhead is effectively reduced; and moreover, retransmission of configuration information bearing the preset higher layer filter coefficient due to poor channel quality may be avoided, therefore, not only is the system signaling overhead further reduced, but also a configuration information load and power consumption of the base station are reduced. Correspondingly, the UE is not required to keep detecting the configuration information which is transmitted by the base station and bears the preset higher layer filter parameter, either, so that power consumption of the UE in reception of the system configuration information is reduced, and particularly for battery-powered UE, for example, a smart meter and a wearable device, endurance of a power supply of the UE may be prolonged, and a user experience in use of the UE in a 5G network may be improved. In addition, receiving time for at least one type of system configuration information is saved for the UE in a path-loss estimation process, so that the efficiency of determining uplink transmission power may be improved, a transmission delay of uplink service data may further be shortened, information transmission efficiency may be improved, and device performance may be improved.

For simple description, each of the abovementioned method embodiments is expressed as a combination of a series of operations, but those skilled in the art should know that the present disclosure is not limited to the described operation sequence because some operations may be executed in other sequences or at the same time according to the present disclosure.

Second, those skilled in the art should also understand that all the embodiments described in the specification are optional embodiments and involved operations and modules are not always required by the present disclosure.

Corresponding to the abovementioned application function realization method embodiments, the present disclosure also provides embodiments of an apparatus for implementing application functions and a corresponding terminal.

Figure 4:
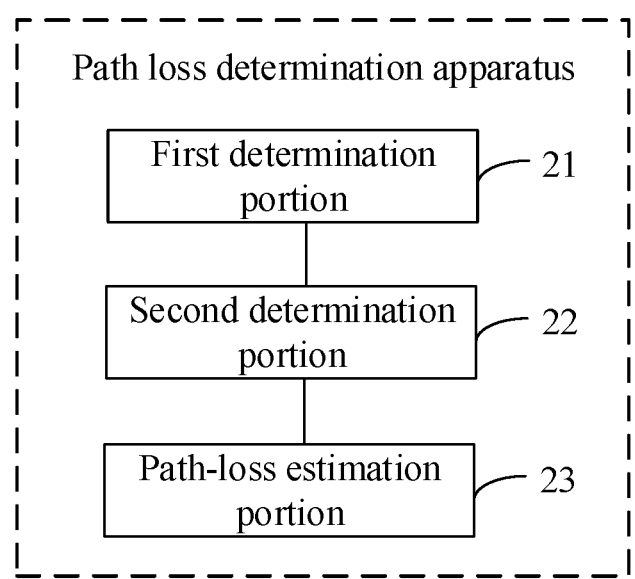
FIG. 4 is a block diagram of a path loss determination apparatus according to some embodiments of the present disclosure.

Referring to FIG. 4, which is a block diagram of a path loss determination apparatus according to some embodiments of the present disclosure. The apparatus may be arranged in UE, and the UE is an NB-IoT device. The apparatus may include:

a first determination portion 21, configured to determine transmission power of a downlink NRS;

a second determination portion 22, configured to determine a measurement value of NRSRP; and a path-loss estimation portion 23, configured to, under a circumstance that a preset higher layer filter parameter is not received from a base station, determine path loss between the base station and the UE according to the transmission power of the downlink NRS and the measurement value of the NRSRP.

Figure 5:
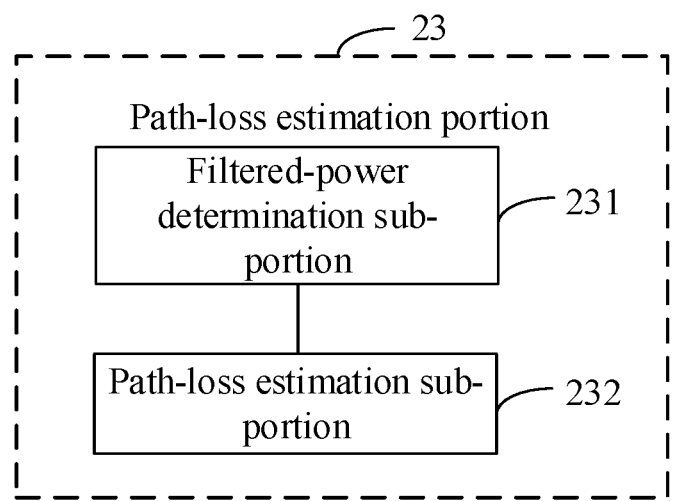
FIG. 5 is a block diagram of another path loss determination apparatus according to some embodiments of the present disclosure.

Referring to FIG. 5, which is a block diagram of a path loss determination apparatus according to some embodiments of the present disclosure. Based on the apparatus embodiment shown in FIG. 4, the path-loss estimation portion 23 may include:

a filtered-power determination sub-portion 231, configured to determine filtered reference signal received power according to a preset higher layer filter coefficient and the measurement value of the NRSRP; and a path-loss estimation sub-portion 232, configured to determine the path loss according to a difference between the transmission power of the downlink NRS and the filtered reference signal received power.

Figure 6:
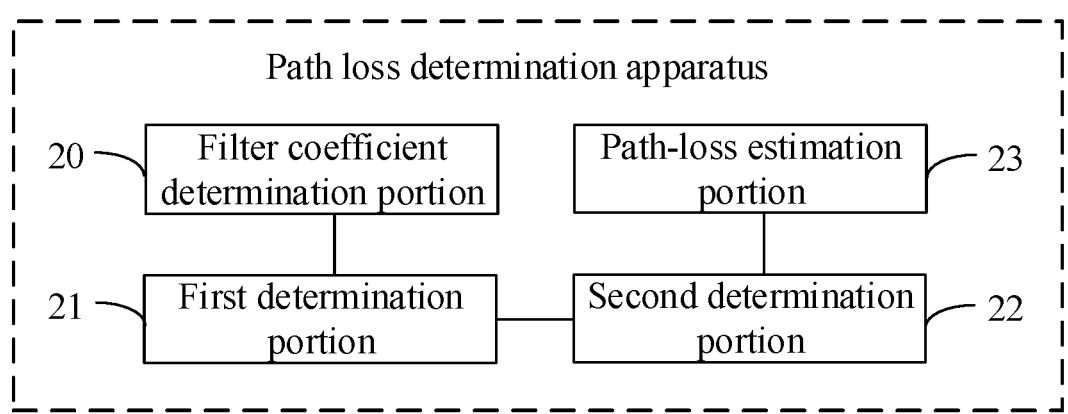
FIG. 6 is a block diagram of another path loss determination apparatus according to some embodiments of the present disclosure.

Referring to FIG. 6, which is a block diagram of a path loss determination apparatus according to some embodiments of the present disclosure. Based on the embodiment shown in FIG. 4, the apparatus may further include:

a filter coefficient determination portion 20, configured to dynamically determine the preset higher layer filter coefficient according to a change of preset parameter information of the UE, the preset parameter information including at least one of a preset device performance parameter and a service type of a bearer service.

In the embodiments of the present disclosure, a value of the preset higher layer filter coefficient may be a numerical value within a range of 0 to 1.

Figure 7:
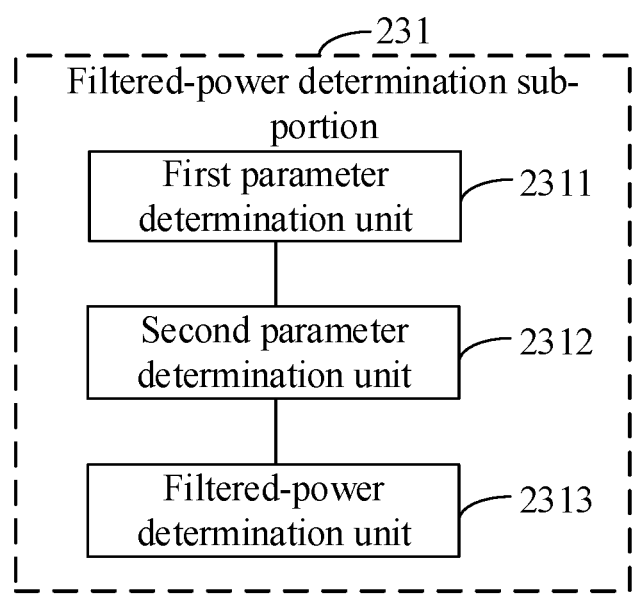
FIG. 7 is a block diagram of another path loss determination apparatus according to some embodiments of the present disclosure.

Referring to FIG. 7, which is a block diagram of a path loss determination apparatus according to some embodiments of the present disclosure. Based on the apparatus embodiment shown in FIG. 5, the filtered-power determination sub-portion 231 may include:

a first parameter determination unit 2311, configured to determine a product of adjacent preceding higher-layer filtered reference signal received power multiplied with an absolute value of a difference between a numerical value 1 and the preset higher layer filter coefficient to be first parameter information;

a second parameter determination unit 2312, configured to determine a product of the preset higher layer filter coefficient multiplied with a measurement value of present reference signal received power to be second parameter information; and a filtered-power determination unit 2313, configured to determine a sum of the first parameter information and the second parameter information to be the filtered reference signal received power.

In another apparatus embodiment of the present disclosure, the path-loss estimation portion 23 may be configured to determine the path loss according to a difference between the transmission power of the downlink NRS and the measurement value of the NRSRP.

The apparatus embodiments substantially correspond to the method embodiments, and thus related parts refer to part of descriptions of the method embodiments. The apparatus embodiments described above are only schematic, units described as separate parts therein may or may not be physically separated, and parts displayed as units may or may not be physical units, and namely may be located in the same place or may also be distributed to multiple network units. Part or all of the portions therein may be selected according to a practical requirement to achieve the purpose of the solutions of the present disclosure. Those of ordinary skill in the art may understand and implement without creative work.

Correspondingly, an aspect provides a path loss determination apparatus, which includes: a processor; and a memory configured to store instructions executable by the processor, wherein the processor is configured to:

determine transmission power of a downlink NRS;

determine a measurement value of NRSRP; and under a circumstance that a preset higher layer filter parameter is not received from a base station, determine path loss between the base station and UE according to the transmission power of the downlink NRS and the measurement value of the NRSRP.

Figure 8:
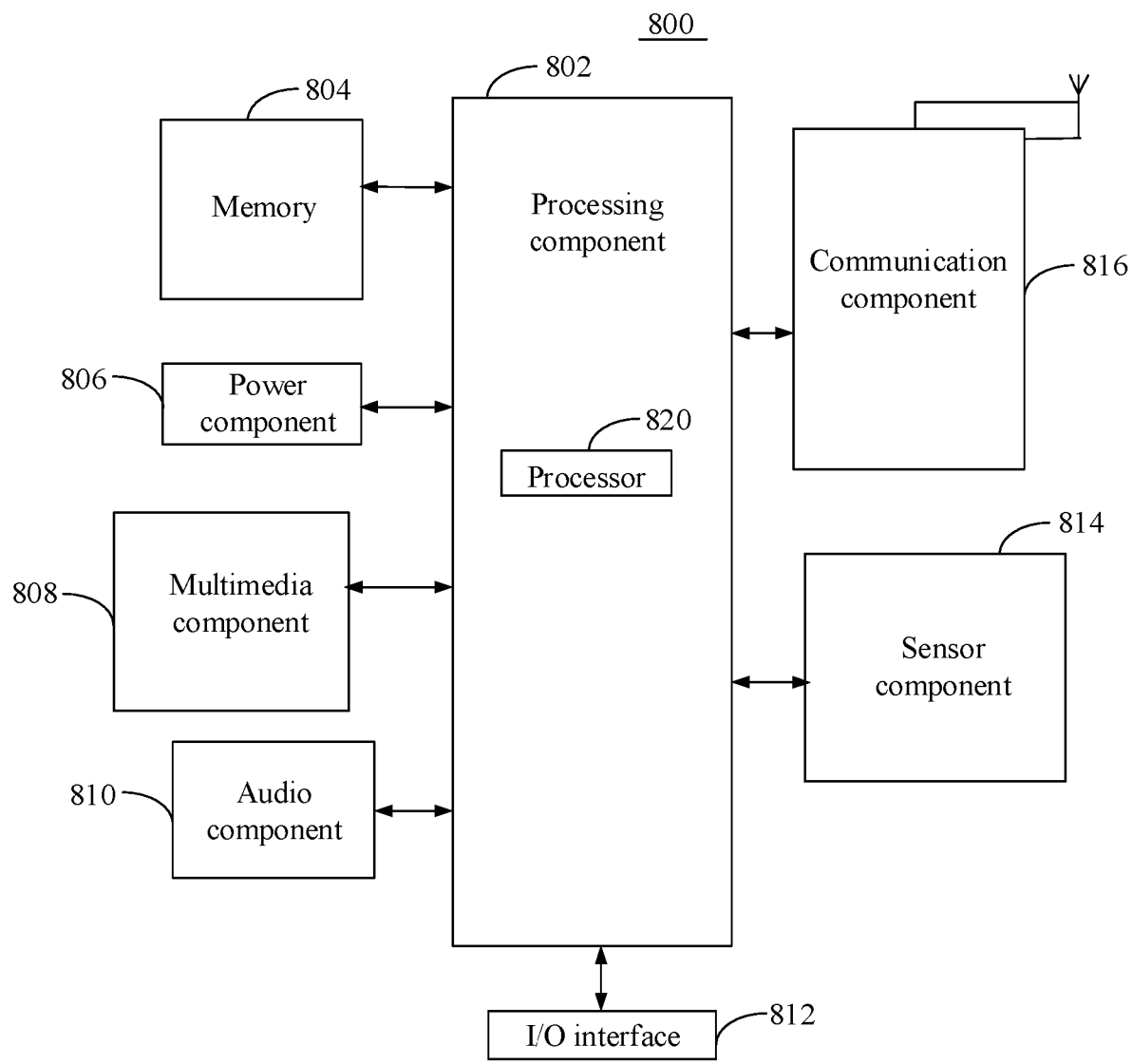
FIG. 8 is a structure diagram of another apparatus applied to determination of path loss according to some embodiments of the present disclosure.

FIG. 8 is a structure diagram of a path loss determination apparatus 800 according to some embodiments of the present disclosure. For example, the apparatus 800 may be UE in a 5G network, which may specifically be a mobile phone, a computer, a digital broadcast terminal, a messaging device, a gaming console, a tablet, a medical device, exercise equipment, a personal digital assistant and a wearable device such as a smart watch, smart glasses, a smart band, smart running shoes, a smart meter and a smart home device, and may be of types such as enhanced Mobile Broad Band (eMBB), mMTC and Ultra-Reliable Low Latency Communication (URLLC) in the 5G network respectively.

Referring to FIG. 8, the apparatus 800 may include one or more of the following components: a processing component 802, a memory 804, a power component 806, a multimedia component 808, an audio component 810, an Input/Output (I/O) interface 812, a sensor component 814, and a communication component 816.

The processing component 802 is typically configured to control overall operations of the apparatus 800, such as the operations associated with display, telephone calls, data communications, camera operations, and recording operations. The processing component 802 may include one or more processors 820 to execute instructions to perform all or part of the operations in the abovementioned method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operations of the apparatus 800. Examples of such data may include instructions for any applications or methods operated on the apparatus 800, contact data, phonebook data, messages, pictures, video, etc. The memory 804 may be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 is configured to provide power for various components of the apparatus 800. The power component 806 may include a power management system, one or more power supplies, and other components associated with generation, management and distribution of power for the apparatus 800.

The multimedia component 808 may include a screen providing an output interface between the apparatus 800 and a user. In some embodiments, the screen may include a Liquid Crystal Display (LCD) and a Touch Panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 808 includes a front camera and/or a rear camera. The front camera and/or the rear camera may receive external multimedia data when the apparatus 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the apparatus 800 is in the operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and a peripheral interface module, and the peripheral interface module may be a keyboard, a click wheel, a button and the like. The button may include, but not limited to: a home button, a volume button, a starting button and a locking button.

The sensor component 814 includes one or more sensors configured to provide status assessment in various aspects for the apparatus 800. For instance, the sensor component 814 may detect an on/off status of the apparatus 800 and relative positioning of components, such as a display and small keyboard of the apparatus 800, and the sensor component 814 may further detect a change in a position of the apparatus 800 or a component of the apparatus 800, presence or absence of contact between the user and the apparatus 800, orientation or acceleration/deceleration of the apparatus 800 and a change in temperature of the apparatus 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the apparatus 800 and another device. The apparatus 800 may access a communication-standard-based wireless network, such as a Wireless Fidelity (Wi-Fi) network, a 2nd-Generation (2G), 3rd-Generation (3G), $4^{th}$-Generation (4G), or $5^{th}$-Generation (5G) network or a combination thereof. In some embodiments of the present disclosure, the communication component 816 receives a broadcast signal or broadcast associated information from an external broadcast management system through a broadcast channel. In some embodiments of the present disclosure, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In some embodiments of the present disclosure, the apparatus 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments of the present disclosure, there is also provided a non-transitory computer-readable storage medium including instructions, such as the memory 804 including instructions, and the instructions may be executed by the processor 820 of the apparatus 800 to implement the path loss determination method. For example, the non-transitory computer-readable storage medium may be a ROM, a Compact Disc Read-Only Memory (CD-ROM), a magnetic tape, a floppy disc, an optical data storage device and the like.

Embodiments of the present disclosure provide a method for determining path loss. The method is applied to a narrowband internet of things (NB-IoT) device and includes:
  determining transmission power of a downlink narrowband reference signal (NRS);
  determining a measurement value of narrowband reference signal received power (NRSRP); and
  determining the path loss between the base station and the UE according to the transmission power of the downlink NRS and the measurement value of the NRSRP.

In some embodiments, the path loss between the base station and the UE may be determined by the transmission power of the downlink NRS, a non-anchor power offset of the downlink NRS, and the measurement value of the NRSRP.

In some embodiments, the path loss between the base station and the UE may be determined by a following formula:

$$PLc=nrs\text{-}Power+nrs\text{-}PowerOffsetNonAnchor-NRSRP$$

wherein PLc is the path loss, nrs-Power is the transmission power of the downlink NRS transmitted by the base station, nrs-PowerOffsetNonAnchor is a power offset of the downlink NRS of the anchor/non-anchor carrier relative to the anchor carrier, and the NRSRP is the narrowband reference signal received power.

Embodiments of the present disclosure provide an apparatus for determining path loss. The apparatus is at least a part of a narrowband internet of things (NB-IoT) device and includes:
  a processor; and
  a memory configured to store instructions executable by the processor,
  wherein the processor is configured to:
  determine transmission power of a downlink narrowband reference signal (NRS);
  determine a measurement value of narrowband reference signal received power (NRSRP); and
  determine the path loss between the base station and the UE according to the transmission power of the downlink NRS and the measurement value of the NRSRP.

In some embodiments, the path loss between the base station and the UE may be determined by the transmission power of the downlink NRS, a non-anchor power offset of the downlink NRS, and the measurement value of the NRSRP.

In some embodiments, the path loss between the base station and the UE may be determined by a following formula:

$$PLc=nrs\text{-}Power+nrs\text{-}PowerOffsetNonAnchor-NRSRP$$

wherein PLc is the path loss, nrs-Power is the transmission power of the downlink NRS transmitted by the base station, nrs-PowerOffsetNonAnchor is a power offset of the downlink NRS of the anchor/non-anchor carrier relative to the anchor carrier, and the NRSRP is the narrowband reference signal received power.

Embodiments of the present disclosure provide a method for determining path loss. The method is applied to a narrowband internet of things (NB-IoT) device and includes:
  determining the path loss between the base station and the UE by a following formula:

$$PLc=nrs\text{-}Power+nrs\text{-}PowerOffsetNonAnchor-NRSRP,$$

wherein PLc is the path loss, nrs-Power is the transmission power of the downlink NRS transmitted by the base station, nrs-PowerOffsetNonAnchor is a non-anchor power offset of the downlink NRS, and the NRSRP is the narrowband reference signal received power.

Embodiments of the present disclosure provide an apparatus for determining path loss. The apparatus is at least a part of a narrowband internet of things (NB-IoT) device and includes:
  a processor; and
  memory configured to store instructions executable by the processor,
  wherein the processor is configured to:
  determine the path loss between the base station and the UE by a following formula:

$$PLc=nrs\text{-}Power+nrs\text{-}PowerOffsetNonAnchor-NRSRP$$

wherein PLc is the path loss, nrs-Power is the transmission power of the downlink NRS transmitted by the base station, nrs-PowerOffsetNonAnchor is a power offset of the downlink NRS of the anchor/non-anchor carrier relative to the anchor carrier, and the NRSRP is the narrowband reference signal received power.

Embodiments of the present disclosure provide a method for determining path loss. The method is applied to a narrowband internet of things (NB-IoT) device and includes:
  determining transmission power of a downlink narrowband reference signal (NRS);
  determining a measurement value of narrowband reference signal received power (NRSRP); and
  under a circumstance that a preset higher layer filter parameter is not applied, determining the path loss between the base station and the UE according to the transmission power of the downlink NRS and the measurement value of the NRSRP.

In some embodiments, the path loss between the base station and the UE may be determined by the transmission power of the downlink NRS, a non-anchor power offset of the downlink NRS, and the measurement value of the NRSRP.

In some embodiments, the path loss between the base station and the UE may be determined by a following formula:

$$PLc = nrs\text{-}Power + nrs\text{-}PowerOffsetNonAnchor - NRSRP$$

wherein PLc is the path loss, nrs-Power is the transmission power of the downlink NRS transmitted by the base station, nrs-PowerOffsetNonAnchor is nrs-PowerOffsetNonAnchor is a power offset of the downlink NRS of the anchor/non-anchor carrier relative to the anchor carrier, and the NRSRP is the narrowband reference signal received power.

Embodiments of the present disclosure provide an apparatus for determining path loss. The apparatus is at least a part of a narrowband internet of things (NB-IoT) device and includes:
  a processor; and
  memory configured to store instructions executable by the processor,
  wherein the processor is configured to:
  determine transmission power of a downlink narrowband reference signal (NRS);
  determine a measurement value of narrowband reference signal received power (NRSRP); and
  under a circumstance that a preset higher layer filter parameter is not applied, determine the path loss between the base station and the UE according to the transmission power of the downlink NRS and the measurement value of the NRSRP.

In some embodiments, the path loss between the base station and the UE may be determined by the transmission power of the downlink NRS, a non-anchor power offset of the downlink NRS, and the measurement value of the NRSRP.

In some embodiments, the path loss between the base station and the UE may be determined by a following formula:

$$PLc = nrs\text{-}Power + nrs\text{-}PowerOffsetNonAnchor - NRSRP$$

wherein PLc is the path loss, nrs-Power is the transmission power of the downlink NRS transmitted by the base station, nrs-PowerOffsetNonAnchor is a power offset of the downlink NRS of the anchor/non-anchor carrier relative to the anchor carrier, and the NRSRP is the narrowband reference signal received power.

Embodiments of the present disclosure provide a method for determining path loss. The method may be applied to UE which is an NB-IoT device and the method can include:
  determining transmission power of a downlink Narrowband Reference Signal (NRS);
  determining a measurement value of narrowband reference signal received power (NRSRP); and
  under a circumstance that a preset higher layer filter parameter is not received from a base station, determining the path loss between the base station and the UE according to the transmission power of the downlink NRS and the measurement value of the NRSRP.

In some embodiments, the determining the path loss between the base station and the UE according to the transmission power of the downlink NRS and the measurement value of the NRSRP may include:
  determining filtered reference signal received power according to a preset higher layer filter coefficient and the measurement value of the NRSRP; and
  determining the path loss according to a difference between the transmission power of the downlink NRS and the filtered reference signal received power.

In some embodiments, the method may further include:
  dynamically determining the preset higher layer filter coefficient according to a change of preset parameter information of the UE, the preset parameter information including at least one of a preset device performance parameter and a service type of a bearer service.

In some embodiments, a value of the preset higher layer filter coefficient may be a numerical value within a range of 0 to 1.

In some embodiments, determining the filtered reference signal received power according to the preset higher layer filter coefficient and the measurement value of the NRSRP may include:
  determining a product of adjacent preceding higher-layer filtered reference signal received power multiplied with an absolute value of a difference between a numerical value 1 and the preset higher layer filter coefficient to be first parameter information;
  determining a product of the preset higher layer filter coefficient and a measurement value of present reference signal received power to be second parameter information; and
  determining a sum of the first parameter information and the second parameter information to be the filtered reference signal received power.

In some embodiments, the determining the path loss between the base station and the UE according to the transmission power of the downlink NRS and the measurement value of the NRSRP may include:
  determining the path loss according to a difference between the transmission power of the downlink NRS and the measurement value of the NRSRP.

The embodiments of the present disclosure provide an apparatus for determining path loss. The apparatus may be arranged in UE which is an NB-IoT device and the apparatus may include:
  a first determination portion, configured to determine transmission power of a downlink NRS;
  a second determination portion, configured to determine a measurement value of NRSRP; and
  a path-loss estimation portion, configured to, under a circumstance that a preset higher layer filter parameter is not received from a base station, determine path loss between the base station and the UE according to the transmission power of the downlink NRS and the measurement value of the NRSRP.

In some embodiments, the path-loss estimation portion may include:
a filtered-power determination sub-portion, configured to determine filtered reference signal received power according to a preset higher layer filter coefficient and the measurement value of the NRSRP; and
a path-loss estimation sub-portion, configured to determine the path loss according to a difference between the transmission power of the downlink NRS and the filtered reference signal received power.

In some embodiments, the apparatus may further include:
a filter coefficient determination -portion, configured to dynamically determine the preset higher layer filter coefficient according to a change of preset parameter information of the UE, the preset parameter information including at least one of a preset device performance parameter and a service type of a bearer service.

In some embodiments, a value of the preset higher layer filter coefficient may be a numerical value within a range of 0 to 1.

In some embodiments, the filtered-power determination sub-portion may include:
a first parameter determination unit, configured to determine a product of adjacent preceding higher-layer filtered reference signal received power multiplied with an absolute value of a difference between a numerical value 1 and the preset higher layer filter coefficient to be first parameter information;
a second parameter determination unit, configured to determine a product of the preset higher layer filter coefficient and a measurement value of present reference signal received power to be second parameter information; and
a filtered-power determination unit, configured to determine a sum of the first parameter information and the second parameter information to be the filtered reference signal received power.

In some embodiments, the path-loss estimation portion may be configured to determine the path loss according to a difference between the transmission power of the downlink NRS and the measurement value of the NRSRP.

The embodiments of the present disclosure provide a non-transitory computer-readable storage medium which has computer instructions stored thereon that, when executed by a processor, cause the processor to implement the above method for determining path loss.

The embodiments of the present disclosure provide an apparatus for determining path loss, which may include:
a processor; and
a memory configured to store instructions executable by the processor,
wherein the processor may be configured to:
determine transmission power of a downlink NRS;
determine a measurement value of NRSRP; and
under a circumstance that a preset higher layer filter parameter is not received from a base station, determine the path loss between the base station and UE according to the transmission power of the downlink NRS and the measurement value of the NRSRP.

Various embodiments of the present disclosure can have one or more of the following advantages.

Considering that UE in the NB-IoT is usually applied to a low-data-transmission-rate, low-speed moving or stationary scenario, high-layer filter coefficient configuration of a base station is of little help to improve measurement accuracy of the UE, therefore, the base station is not needed to send configuration information bearing a preset higher layer filter coefficient to the UE in real time to enable the UE to determine the higher layer filter coefficient according to the configuration information, so that a system signaling overhead is effectively reduced; and moreover, retransmission of the configuration information bearing the preset higher layer filter coefficient due to poor channel quality may be avoided, so that not only is the system signaling overhead further reduced, but also a configuration information load and power consumption of the base station can be reduced. Correspondingly, the UE is not needed to keep detecting the configuration information which is transmitted by the base station and bears the preset higher layer filter coefficient, so that power consumption of the UE in reception of the system configuration information can be reduced, and a user experience in use of the UE in a 5G network is improved. In addition, receiving time for at least one type of system configuration information may be saved for the UE in a path-loss estimation process, so that the efficiency of determining uplink transmission power may be improved, a transmission delay of uplink service data may further be shortened, the efficiency of information transmission may be improved, and device performance may be upgraded.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for determining path loss, implemented by a narrowband internet of things (NB-IoT) device, the method comprising:
   determining transmission power of a downlink narrowband reference signal (NRS);
   determining a measurement value of narrowband reference signal received power (NRSRP); and
   determining the path loss between a base station and the NB-IoT device according to the transmission power of the downlink NRS and the measurement value of the NRSRP,
   wherein the path loss between the base station and the NB-IoT device is determined by $$PLc = nrs\text{-}Power + nrs\text{-}PowerOffsetNonAnchor - NRSRP,$$

wherein PLc is the path loss, nrs-Power is the transmission power of the downlink NRS transmitted by the base station, nrs-PowerOffsetNonAnchor is a non-anchor power offset of the downlink NRS, and the NRSRP is actual received power, measured by a physical layer of the NB-IoT device, of the downlink NRS.

2. The method of claim 1, wherein the path loss between the base station and the NB-IoT device is determined by the transmission power of the downlink NRS, a non-anchor power offset of the downlink NRS, and the measurement value of the NRSRP.

3. A communication system implementing the method of claim 1, comprising the NB-IoT device, wherein the NB-IoT device is configured to:
   determine filtered reference signal received power according to a preset higher layer filter coefficient and the measurement value of the NRSRP; and
   determine the path loss according to a difference between the transmission power of the downlink NRS and the filtered reference signal received power.

4. The communication system of claim 3, wherein the NB-IoT device is further configured to:
   dynamically determining the preset higher layer filter coefficient according to a change of preset parameter information of the NB-IoT device, the preset parameter information including at least one of a preset device performance parameter and a service type of a bearer service.

5. The communication system of claim 4, wherein a value of the preset higher layer filter coefficient is a numerical value within a range of 0 to 1.

6. The communication system of claim 5, wherein the determining the filtered reference signal received power according to the preset higher layer filter coefficient and the measurement value of the NRSRP comprises:
determining a product of adjacent preceding higher-layer filtered reference signal received power multiplied with an absolute value of a difference between a numerical value 1 and the preset higher layer filter coefficient to be first parameter information;
determining a product of the preset higher layer filter coefficient and a measurement value of present reference signal received power to be second parameter information; and
determining a sum of the first parameter information and the second parameter information to be the filtered reference signal received power.

7. The communication system of claim 6, wherein the determining the path loss between the base station and the NB-IoT device according to the transmission power of the downlink NRS and the measurement value of the NRSRP comprises:
determining the path loss according to a difference between the transmission power of the downlink NRS and the measurement value of the NRSRP.

8. The communication system of claim 7, wherein the NB-IoT device is user equipment (UE).

9. The communication system of claim 8, wherein the UE is configured for a low-data-transmission-rate, low-speed moving or stationary application in a 5G network, with a measurement accuracy being substantially unaffected by a high-layer filter coefficient configuration of the base station.

10. The communication system of claim 9, further comprising the base station.

11. The communication system of claim 10, wherein the base station is configured not to send configuration information bearing a preset higher layer filter coefficient to the UE in real time to enable the UE to determine the higher layer filter coefficient according to the configuration information, such that a system signaling overhead is effectively reduced.

12. The communication system of claim 11, wherein the communication system is configured to avoid retransmission of the configuration information bearing the preset higher layer filter coefficient due to poor channel quality, thereby further reducing the system signaling overhead, and reducing a configuration information load and power consumption of the base station.

13. The communication system of claim 12, wherein the UE is configured not to continuously detect the configuration information transmitted by the base station and bearing the preset higher layer filter coefficient, to thereby reduce power consumption of the UE in reception of the system configuration information and improve user experience in use of the UE in the 5G network.

14. The communication system of claim 13, wherein the UE is configured to eliminate at least receiving time for one type of system configuration information in a path-loss estimation process, thereby improving efficiency of determining uplink transmission power, shortening a transmission delay of uplink service data, improving efficiency of information transmission and device performance.

15. The communication system of claim 14, wherein the UE comprises a smart meter, and the present filtered reference signal received power $F_n$ is calculated with:

$$F_n = (1-\alpha)F_{n-1} + \alpha M_n,$$

wherein $\alpha$ represents the preset higher layer filter coefficient in the UE, $F_n$ represents the present filtered reference signal received power, $F_{n-1}$ represents the adjacent preceding higher layer filtered reference signal received power, and $M_n$ represents the measurement value, presently obtained by the physical layer of the UE, of the NRSRP.

16. The communication system of claim 15, wherein the smart meter is configured to estimate the path loss by:

PLc=nrs-Power+nrs-PowerOffsetNonAnchor−higher layer filtered NRSRP, wherein PLc represents the path loss, nrs-Power represents the transmission power of the NRS transmitted by the base station, nrs-PowerOffsetNonAnchor represents a non-anchor power offset of the NRS, and the higher layer filtered NRSRP is a narrowband reference signal power filtered by the higher layer.

17. An apparatus for determining path loss, the apparatus being at least a part of a narrowband internet of things (NB-IoT) device, the apparatus comprising:
a processor; and
memory configured to store instructions executable by the processor,
wherein the processor is configured to:
determine transmission power of a downlink narrowband reference signal (NRS);
determine a measurement value of narrowband reference signal received power (NRSRP); and
determine the path loss between a base station and the apparatus according to the transmission power of the downlink NRS and the measurement value of the NRSRP,
wherein the path loss between the base station and the apparatus is determined by a following formula:

PLc=nrs-Power+nrs-PowerOffsetNonAnchor NRSRP wherein PLc is the path loss, nrs-Power is the transmission power of the downlink NRS transmitted by the base station, nrs-PowerOffsetNonAnchor is a non-anchor power offset of the downlink NRS, and the NRSRP is actual received power, measured by a physical layer of the NB-IoT device, of the downlink NRS.

18. The apparatus of claim 17, wherein the path loss between the base station and the apparatus is determined by the transmission power of the downlink NRS, a non-anchor power offset of the downlink NRS, and the measurement value of the NRSRP.

* * * * *